United States Patent Office 3,419,575
Patented Dec. 31, 1968

3,419,575
NOVEL 2-AMINO-5-AMINOALKYL-THIADIAZOLES
Gerhart Rudolf Griss, Biberach (Riss), Germany, assignor to Boehringer Ingelheim G.m.b.H., Ingelheim am Rhine, Germany, a corporation of Germany
No Drawing. Filed Mar. 23, 1965, Ser. No. 442,183
Claims priority, application Germany, Mar. 26, 1964, T 25,922
4 Claims. (Cl. 260—306.8)

ABSTRACT OF THE DISCLOSURE

The compounds are 2-amino-5-aminoalkyl-thiadiazoles and non-toxic, pharmacologically acceptable acid addition salts thereof, useful as antitussives, analgesics and antipyretics in warm-blooded animals.

This invention relates to novel aminoalkyl-substituted 5-membered unsaturated heterocycles and acid addition salts thereof, as well as to various methods of preparing these compounds.

More particularly, the present invention relates to compounds of the formula

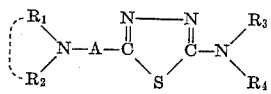

wherein:

$R_1$ and $R_2$ are each selected from the group consisting of lower alkyl, allyl, phenyl, benzyl and cyclohexyl and, together with each other and the nitrogen atom to which they are attached, form a basic heterocyclic ring selected from the group consisting of pyrrolidino, piperidino, morpholino and camphidino, $R_3$ is selected from the group consisting of hydrogen, alkyl of 1 to 8 carbon atoms, diethylamino-lower alkyl, allyl, phenyl, acetyl and benzoyl, $R_4$ is selected from the group consisting of hydrogen and ethyl, and A is alkylene of 1 to 3 carbon atoms, and their non-toxic, pharmacologically acceptable acid addition salts.

In other words, the compounds of the present invention are derivatives of 1,3,4-thiadiazole and of 1,2,4-triazole and its tautomeric forms.

The compounds embraced by Formula I above may be prepared by various methods, among which the following have been found to be the most convenient and efficient:

Method A

By subjecting a compound of the formula

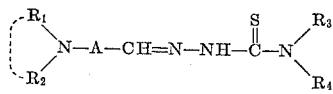

wherein $R_1$ through $R_4$ and A have the same meanings as in Formula I, to an oxidative ring closure reaction. The oxidation reaction is carried out with the aid of an oxidizing agent in the presence of an inorganic or organic solvent, preferably water, at elevated temperatures, most advantageously at the boiling point of the solvent. Examples of oxidizing agents which may be used for this purpose include hydrogen peroxide, ferric chloride, bromine or iodine as well as alkali metal ferricyanides which are particularly preferred.

Method B

By subjecting a compound of the formula

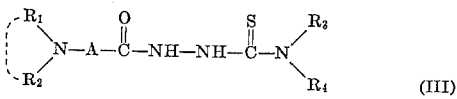

wherein $R_1$ through $R_4$ and A have the same meanings as in Formula I, or an acid addition salt thereof, to a dehydrolyzing reaction. The dehydrolyzing reaction is effected either with the aid of a customary dehydrolyzing agent, such as sulfuric acid, phosphorus oxychloride or thionyl chloride, or with the aid of an acylhalide in the presence or absence of an inert organic solvent, such as acetone, benzene or toluene, at moderately elevated temperatures and preferably at the boiling point of the particular solvent if one is used. The dehydrolysis may, however, also be effected without the use of a dehydrolyzing agent, namely, by azeotropic distillation of a solution of compound II in an inert solvent, such as benzene or toluene.

If an acylhalide is used as the dehydrolyzing agent, the reaction product is a compound of the Formula I wherein $R_3$ is the corresponding acyl radical. If desired, this acyl radical may subsequently be removed by mild alkaline hydrolysis, whereby the corresponding compound wherein $R_3$ is hydrogen is obtained.

Method C

By reacting a hydrohalic acid addition salt of an iminoether of the formula

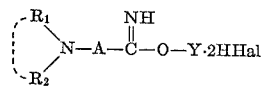

wherein $R_1$, $R_2$ and A have the same meanings as in Formula I, Y is lower alkyl and Hal is halogen, with a compound of the formula

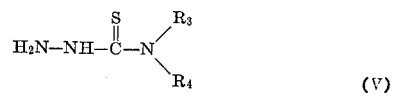

wherein $R_3$ and $R_4$ have the same meanings as in Formula I. The reaction is preferably carried out in the presence of an organic solvent, such as ethanol or pyridine, and at elevated temperatures, preferably at the boiling point of the particular solvent, and if desired in the presence of a customary agent capable of tying up or neutralizing the hydrohalic acid split off by the reaction.

A free base compound of the present invention prepared by any of the methods described above may subsequently be converted into a non-toxic, pharmacologically acceptable acid addition salt thereof pursuant to well-known methods; for instance, by dissolving the free base in a suitable solvent and acidifying the solution with one or more molar equivalents of the desired inorganic or organic acid. Examples of inorganic and organic acids which will form non-toxic, pharmacologically acceptable acid addition salts with a compound of the Formula I are hydrochloric acid, sulfuric acid, phosphoric acid, tartaric acid, succinic acid, citric acid, maleic acid, fumaric acid, 8-chlorotheophylline and the like.

In those instances where the above-described methods A through C yield an end product of the Formula I wherein $R_3$ is hydrogen, this end product may, if desired, subsequently be acetylated or benzoylated in the $R_3$-position; for instance, by reaction with a halide or anhydride of acetic acid or benzoic acid.

The preparation of compounds of the Formulas IV and V, which are used as starting materials in method C, is described in the literature [for instance, cf. Chem. Abstr. 47, 8641f; Helv. Chimica Acta 33, 1773–1775 (1950); J. pr. Chem. 159, 191 (1941); Rec. Trav. Chim. 62, 5–11 (1943)].

The thiosemicarbazones of the Formula II, which are used as starting materials in method A, may be obtained pursuant to known methods, namely, by reacting a compound of the Formula V with a corresponding aminoaldehyde or a reactive derivative thereof.

The majority of the thiosemicarbazides of the Formula III, which are used as starting materials in method B, are also described in the literature. Those which have not been specifically described in the prior art may be prepared by well known methods; for instance, by reacting a hydrazide of the formula

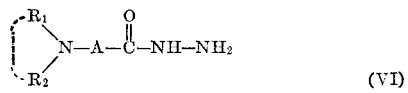

(VI)

wherein $R_1$, $R_2$ and A have the same meanings as in Formula I, with a corresponding thiocyanate. The following is a list of previously unknown compounds of the Formula III which were prepared for use as starting materials in the preparation of compounds of the Formula I by method B:

(1) $N^1$ - (N,N - Dimethylglycyl) - thiosemicarbazide monohydrochloride; M.P. 217° C.;

(2) $N^1$ - (N - Cyclohexyl - N - methyl - glycyl) - thiosemicarbazide; M.P. 206–208° C.;

(3) $N^1$-(N - Cyclohexyl - N - methyl - glycyl) - $N^4$-allyl-thiosemicarbazide; M.P. 118–120° C.

The following examples further illustrate the present invention and will enable others skilled in the art to understand it more completely. It should be understood, however, that the present invention is not limited solely to the particular examples given below.

EXAMPLE 1

Preparation of 2-amino-5-(N-methyl-N-cyclohexylaminoethyl)-1,3,4-thiadiazole by Method A 19 gm. (0.078 mol) of β-(N-methyl-N-cyclohexylamino)-propionaldehyde diethylacetal (B.P. 144–146° C. at 11 mm. Hg) were subjected to acid hydrolysis with 105 cc. of 6 N hydrochloric acid at 40–60° C., and the hydrochloric acid was then evaporated. The β-(N-methyl-N-cyclohexylamino)-propionaldehyde hydrochloride thus obtained was dissolved in 33 cc. of water, the resulting solution was admixed with 13 gm. (0.102 mol) of thiosemicarbazide hydrochloride and 14.4 gm. of anhydrous sodium acetate, and the mixture was heated on a boiling water bath. The β-(N-methyl-N-cyclohexylamino)-propionaldehyde thiosemicarbazone formed thereby, without being isolated in the pure state, was subsequently subjected to an oxidative ring closure reaction by heating it for two to three hours on a boiling water bath with a solution of 67.7 gm. (0.206 mol) of potassium ferricyanide in 225 cc. of water. Thereafter, the reaction solution was allowed to cool, made alkaline with sodium hydroxide and extracted several times with chloroform. The chloroform extract solutions were combined, dried over sodium sulfate, and the chloroform was evaporated. The residue was recrystallized from acetone, yielding a substance having a melting point of 162–163° C., which was identified to be 2-amino-5-(N-methyl-N-cyclohexylaminoethyl)-1,3,4-thiadiazole of the formula

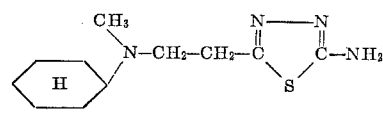

The yield was 68% of theory.

EXAMPLE 2

Preparation of 2-amino-5-(dimethylamino-methyl)-1,3,4-thiadiazole by Method B 5 gm. (0.024 mol) of N-dimethylglycyl thiosemicarbazide-(1) hydrochloride (M.P. 216° C.) were heated for thirty minutes at 40–50° C. with 25 gm. of concentrated sulfuric acid. Thereafter, the reaction mixture was allowed to cool and was then poured over 500 gm. of ice; the aqueous solution was neutralized with sodium carbonate and evaporated to dryness. The residue was extracted with ethanol to separate the reaction product from inorganic impurities, the ethanol extract solution was evaporated, and the residue was recrystallized from ether in a Soxhlet apparatus. A substance having a melting point of 205–307° C. was obtained, which was identified to be 2-amino-5-(dimethylamino-methyl)-1,3,4-thiadiazole of the formula

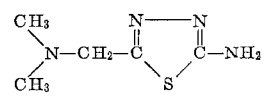

The yield was 25% of theory.

EXAMPLE 3

Preparation of 2-amino-5-(diethylamino-ethyl)-1,3,4-thiadiazole by Method C 46.2 gm. (0.2 mol) of β-diethylamino-propionic acid iminomethylether dihydrochloride, obtained from β-diethylamino-propionitrile by methanol addition in dioxane accompanied by introduction of a stoichiometric amount of hydrochloric acid, were refluxed for two hours with 18.2 gm. (0.2 mol) of thiosemicarbazide in 120 cc. of absolute ethanol. Thereafter, the ethanol was distilled off, the residue was taken up in 100 cc. of water, the aqueous solution was made alkaline with sodium carbonate, and the alkaline solution was extracted several times with chloroform. The combined chloroform extract solution was dried over sodium sulfate, the chloroform was evaporated, and the residue was recrystallized from ethylacetate in the presence of finely divided, high-adsorbency activated charcoal. A substance having a melting point of 158–160° C. was obtained, which was identified to be 2-amino-5-(diethylamino-ethyl)-1,3,4-thiadiazole of the formula

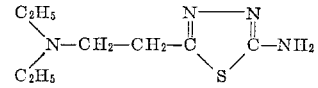

The yield was 19.5% of theory.

EXAMPLE 4

Preparation of 2-acetamido-5-(dimethylamino-methyl)-1,3,4-thiadiazole and its hydrochloride A mixture of 16 gm. (0.1 mol) of 2-amino-5-(dimethylamino-methyl)-1,3,4-thiadiazole (the end product of Example 7), 100 cc. of glacial acetic acid and 20 gm. (0.2 mol) of acetic acid anhydride was refluxed for two hours. Thereafter, the acetic acid and acetic acid anhydride were distilled off. The residue was identified to be 2-acetamido-5-(dimethylamino-methyl)-1,3,4 - thiadiazole. The residue was taken up in ethanol, and the resulting solution was admixed with an equivalent amount of ethanolic hydrochloric acid. The mixture was cooled, whereupon a crystalline precipitate formed which was collected and recrystallized from methanol. A colorless crystalline compound having a melting point of 238–240° C. was obtained. It was identified to be the hydrochloride of 2-acetamino-5-(dimethylamino-methyl)-1,3,4-thiadiazole of the formula

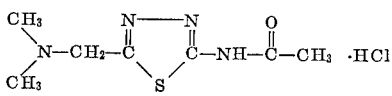

The yield was 71% of theory.

EXAMPLE 5

Preparation of 2-benzamido-5-(dimethylamino-methyl)-1,3,4-thiadiazole hydrochloride 3.2 gm. (0.02 mol) of 2-amino-5-(dimethylamino-methyl)-1,3,4-thiadiazole were dissolved in 10 cc. of pyridine, and the resulting solution was admixed with 5.6 gm. (0.04 mol) of benzoyl chloride. The reaction mixture was then heated for a few hours at 40–50° C., during which time a precipitate separated out. The precipitate was collected and recrystallized from ethanol. A colorless crystalline substance having a melting point of 260–261° C. (decomposition) was obtained. It was identified to be 2-benzamido-5-(dimethylamino-methyl)-1,3,4-thiadiazole hydrochloride of the formula

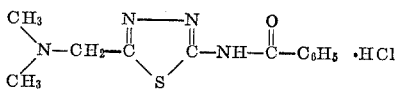

The yield was 74% of theory.

EXAMPLE 6

Preparation of 2-anilino-5-(N-cyclohexyl-N-methyl-amino-methyl)-1,3,4-thiadiazole by Method A 12.2 gm. (0.04 mol) of α-[cyclohexyl-methyl-amino]-acetaldehyde-4-phenyl-thiasemicarbazone were suspended in 250 cc. of chloroform, and then a solution of 6.4 gm. (0.04 mol) of bromine in 50 cc. of chloroform was added dropwise at room temperature to the suspension, accompanied by stirring, whereby a homogeneous solution was formed. After all of the bromine solution had been added, the reaction solution was evaporated, the residue was dissolved in absolute ethanol, the resulting solution was made slightly alkaline by adding solid sodium carbonate thereto, and the insoluble inorganic salts were separated by vacuum filtration. The filtrate was evaporated, and the residue was recrystallized from aqueous methanol. A compound having a melting point of 206–208° C. was obtained, which was identified to be 2-anilino-5-(N-cyclohexyl-N-methyl-aminomethyl) -1,3,4-thiadiazole of the formula

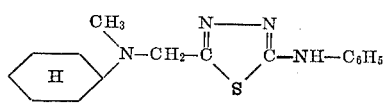

The yield was 12% of theory.

EXAMPLE 7

Preparation of 2-anilino-5-(N-cyclohexyl-N-methyl-amino-methyl)-1,3,4-thiadiazole by Method A A mixture of 12.2 gm. (0.04 mol) of α-[N-cyclohexyl-N - methyl - amino]-acetaldehyde-4-phenyl-thiasemicarbazide, 200 cc. of ethanol and 10.8 gm. (0.04 mol) of ferric chloride hexahydrate was refluxed for five hours. Thereafter, the ethanol was distilled off, the residue was taken up in 200 cc. of water, the resulting solution was made alkaline with sodium hydroxide and filtered, and the filtrate was repeatedly extracted with chloroform. The chloroform extract solutions were combined, dried over sodium sulfate, and evaporated to dryness. The residue was recrystallized from aqueous methanol. The product was identical to that obtained in Example 16. The yield was 22% of theory.

EXAMPLE 8

Using a procedure analogous to that described in Example 1, 2 - amino-5-(diethylamino-methyl)-1,3,4-thiadiazole, M.P. 207–208° C., of the formula

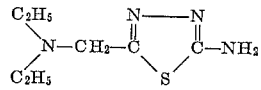

was prepared from N,N-diethylamino-acetaldehyde-thiosemicarbazone and potassium ferricyanide.

*Analysis.*—C₇H₁₄N₄S: Calculated: C, 45.13%; H, 7.58%. Found: C, 45.20%; H, 7.68%.

EXAMPLE 9

Using a procedure analogous to that described in Example 1, 2-amino-5-(di-n-propylamino-methyl)-1,3,4-thiadiazole, M.P. 206–207° C., was prepared from N,N-di-n-propylamino-acetaldehyde-thiosemicarbazone and potassium ferricyanide.

*Analysis.*—C₉H₁₈N₄S: Calculated: C, 50.43%; H, 8.47%. Found: C, 50.80%; H, 8.52%.

EXAMPLE 10

Using a procedure analogous to that described in Example 1, 2-amino-5-(di-n-butylamino-methyl)-1,3,4-thiadiazole, M.P. 178–180° C., was prepared from N,N-di-n - butylamino-acetaldehyde-thiosemicarbazone and potassium ferricyanide.

*Analysis.*—C₁₁H₂₂N₄S: Calculated: C, 54.51%; H, 9.15%. Found: C, 54.20%; H, 9.32%.

EXAMPLE 11

Using a procedure analogous to that described in Example 1, 2 - amino-5-(di-n-amylamino-methyl)-1,3,4-thiadiazole, M.P. 155–156° C., was prepared from N,N-di-n-amylamino - acetaldehyde-thiosemicarbazone and potassium ferricyanide.

EXAMPLE 12

Using a procedure analogous to that described in Example 1, 2 - amino-5-(diallylamino-methyl)-1,3,4-thiodiazole, M.P. 165–166° C., of the formula

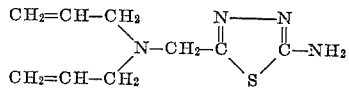

was prepared from N,N-diallylamino-acetaldehyde-thiosemicarbazone and potassium ferricyanide.

*Analysis.*—C₉H₁₄N₄S: Calculated: C, 51.40%; H, 6.71%. Found: C, 50.90%; H, 6.77%.

EXAMPLE 13

Using a procedure analogous to that described in Example 1, 2-amino-5-(β-dimethylamino-ethyl)-1,3,4-thiadiazole, M.P. 180–181° C., of the formula

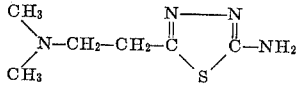

was prepared from β-(N,N-dimethylamino)-propionaldehyde-thiosemicarbazone and potassium ferricyanide.

*Analysis.*—C₆H₁₂N₄S: Calculated: C, 41.8%; H, 6.98%; Found: C, 41.8%; H, 7.21%.

EXAMPLE 14

Using a procedure analogous to that described in Example 1,2 - amino - 5 - (β-di-n-propylamino-ethyl)-1,3,4-thiadazole, M.P. 158–160° C., was prepared from β-(N,N - di - n-propylamino)-propionaldehyde-thiosemicarbazone and potassium ferricyanaide.

*Analysis.*—C₁₀H₂₀N₄S: Calculated: C, 52.59%; H, 8.83%; Found: C, 52.45%; H, 8.83%.

EXAMPLE 15

Using a procedure analogous to that described in Example 1,2 - amino-5-(β-di-n-butylamino-ethyl)-1,3,4-thiadiazole, M.P. 125–126° C., was prepared from β-(N,N-di - n - butylamino)-propionaldehyde-thiosemicarbazone and potassium ferricyanide.

*Analysis.*—$C_{12}H_{24}N_4S$: Calculated: C, 56.21%; H, 9.44%; Found: C, 56.00%; H, 9.37%.

EXAMPLE 16

Using a procedure analogous to that described in Example 1,2 - amino-5-(β-di-n-amylamino-ethyl)-1,3,4-thiadiazole, M.P. 121–122° C., was prepared from β-(N,N-di - n - amylamino)-propionaldehyde-thiosemicarbazone and potassium ferricyanide.

*Analysis.*—$C_{14}H_{28}N_4S$: Calculated: C, 59.11%; H, 9.92%; Found: C, 59.10%; H, 9.52%.

EXAMPLE 17

Using a procedure analogous to that described in Example 1,2 - amino - 5-(β-diallylamino-ethyl)-1,3,4-thiadiazole, M.P. 76–78° C., was prepared from β-N,N-diallylamino-propionaldehyde-thiosemicarbazone and potassium ferricyanide.

*Analysis.*—$C_{10}H_{16}N_4S$: Calculated: C, 53.54%; H, 7.19%; Found: C, 53.65%; H, 7.32%.

EXAMPLE 18

Using a procedure analogous to that described in Example 1,2 - amino - 5-(β-mopholino-ethyl)-1,3,4-thiadiazole, M.P. 192–193° C., of the formula

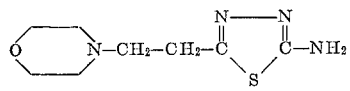

was prepared from β-morpholinopropionaldehyde-thiosemicarbazone and potassium ferricyanide.

*Analysis.*—$C_8H_{14}N_4S$: Calculated: C, 44.84%; H, 6.59%; Found: C, 44.35%; H, 6.76%.

EXAMPLE 19

Using a procedure analogous to that described in Example 2,2 - amino-5-(α-diallylamino-ethyl)-1,3,4-thiadiazole, M.P. 124° C., of the formula

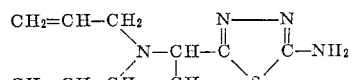

was prepared from α-diallylaminopropionyl-thiosemicarbazide-(1) hydrochloride and concentrated sulfuric acid.

*Analysis.*—$C_{10}H_{16}N_4S$: Calculated: C, 53.5%; H, 7.19%; Found: C, 53.7%; H, 7.40%.

EXAMPLE 20

Using a procedure analogous to that described in Example 2,2 - amino-5-(γ-diallylamino-n-propyl)-1,3,4-thiadiazole, M.P. 143–145° C., of the formula

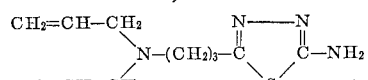

was prepared from γ-diallylaminobutyryl-thiosemicarbazide-(1) hydrochloric and concentrated sulfuric acid.

*Analysis.*—$C_{11}H_{18}N_4S$: Calculated: C, 55.4%; H, 7.61%; Found: C, 55.5%; H, 7.64%.

EXAMPLE 21

Using a procedure analogous to that described in Example 2,2 - methylamino-5-(diallylamino-methyl)-1,3,4-thiadiazole, M.P. 56–57° C., of the formula

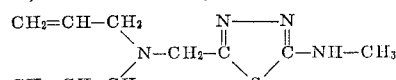

was prepared from N,N-diallylglycyl-4-methyl-thiosemicarbazide-(1) hydrochloride and concentrated sulfuric acid.

*Analysis.*—$C_{10}H_{16}N_4S$: Calculated: C, 53.5%; H, 7.19%; Found: C, 53.8%; H, 7.44%.

EXAMPLE 22

Using a procedure analogous to that described in Example 2,2 - ethylamino - 5 - (diallylamino-methyl)-1,3,4-thiadiazole dihydrochloride, M.P. 205–210° C., was prepared from N,N-diallylglycol-4-ethyl-thiosemicarbazide-(1) hydrochloride and concentrated sulfuric acid.

*Analysis.*—$C_{11}H_{18}N_4S \cdot 2HCl$: Calculated: C, 42.4%; H, 6.82%; Found: C, 42.2%; H, 6.82%.

EXAMPLE 23

Using a procedure analogous to that described in Example 2,2 - n - butylamino-5-(diallylamino-methyl)-1,3,4-thiadiazole dihydrochloride, M.P. 186–187° C., was prepared from N,N - diallylglycyl - 4 - n - butyl-thiosemicarbazide-(1) hydrochloride and concentrated sulfuric acid.

*Analysis.*—$C_{13}H_{22}N_4S \cdot 2HCl$: Calculated: C, 46.0%; H, 7.13%; Found: C, 45.8%; H, 7.25%.

EXAMPLE 24

Using a procedure analogous to that described in Example 2, 2-n-butylamino-5-(diallylamino-methyl)-1,3,4-thiadiazole, M.P. 49–50° C., was prepared from N,N-diallylglycyl-4-n-butyl-thiosemicarbazide-(1) hydrochloride and concentrated sulfuric acid.

*Analysis.*—$C_{13}H_{22}N_4S$: Calculated: C, 58.6%; H, 8.27%; Found: C, 58.5%; H, 8.31%.

EXAMPLE 25

Using a procedure analogous to that described in Example 2, 2-n-amylamino-5-(diallylamino-methyl) - 1,3,4-thiadiazole, M.P. 58–60° C., was prepared from N,N-diallylglycyl-4-n-amyl-thiosemicarbazide - (1) hydrochloride and concentrated sulfuric acid.

*Analysis.*—$C_{14}H_{24}N_4S$: Calculated: C, 60.0%; H, 8.63%; Found: C, 60.1%; H, 8.68%.

EXAMPLE 26

Using a procedure analogous to that described in Example 2, 2-diethylamino-5-(diallylamino-methyl)-1,3,4-thiadiazole dihydrochloride, M.P. 76–77° C., of the formula

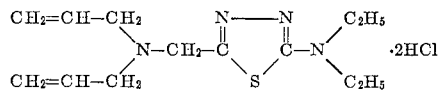

was prepared from N,N-diallylglycyl-4-diethyl-thiosemicarbazide-(1) hydrochloride and concentrated sulfuric acid.

*Analysis.*—$C_{13}H_{22}N_4S \cdot 2HCl$: Calculated: C, 46.0%; H, 7.13%; Found: C, 44.5%; H, 7.45%.

EXAMPLE 27

Using a procedure analogous to that described in Example 2, 2-n-octylamino-5-(diallylamino-methyl)-1,3,4-thiadiazole, M.P. 75–76° C., of the formula

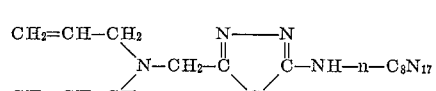

was prepared from N,N-diallylglycyl-4-n-octyl-thiosemicarbazide-(1) hydrochloride and concentrated sulfuric acid.

*Analysis.*—$C_{17}H_{30}N_4S$: Calculated: C, 63.3%; H, 9.38%; Found: C, 63.3%; H, 9.41%.

EXAMPLE 28

Using a procedure analogous to that described in Example 2, 2-[(β-diethylamino-ethyl)-amino] - 5 - (diallyl-amino-methyl)-1,3,4 - thiadiazole trihydrochloride, M.P. 171–173° C., of the formula

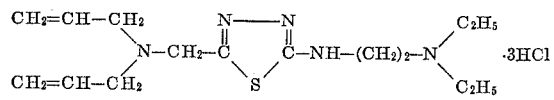

was prepared from N,N-diallylglycyl-4-(β-diethylaminoethyl)-thiosemicarbazide-(1) hydrochloride and concentrated sulfuric acid.

*Analysis.*—$C_{15}H_{27}N_5S \cdot 3HCl$: Calculated: C, 43.0%; H, 7.22%; Found: C, 42.8%; H, 7.47%.

EXAMPLE 29

Using a procedure analogous to that described in Example 2, 2-(γ-diethylamino-n-propyl-amino)-5-(diallylamino-methyl)-1,3,4 - thiadiazole trihydrochloride, M.P. 113° C., of the formula

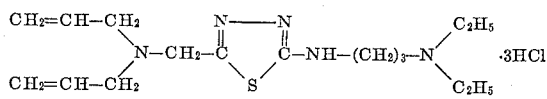

was prepared from N,N-diallylglycyl-4-(γ-diethylamino-n-propyl)-thiosemicarbazide-(1) hydrochloride and concentrated sulfuric acid.

*Analysis.*—$C_{16}H_{29}N_5S \cdot 3HCl$: Calculated: C, 44.4%; H, 7.57%; Found: C, 44.6%; H, 7.76%.

EXAMPLE 30

Using a prcoedure analogous to that described in Example 2, 2-amino-5-(camphidino-methyl) - 1,3,4 - thiadiazole, M.P. 193–194° C., of the formula

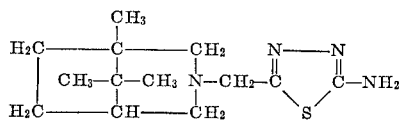

was prepared from camphidinoacetyl-thiosemicarbazide-(1) hydrochloride and concentrated sulfuric acid.

*Analysis.*—$C_{13}H_{22}N_4S$: Calculated: C, 58.6%; H, 8.32%; Found: C, 58.6%; H, 8.42%.

EXAMPLE 31

Using a procedure analogous to that described in Example 2, 2-amino-5-(pyrrolidino-methyl)-1,3,4 - thiadiazole, M.P. 218–219° C., of the formula

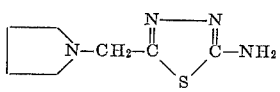

was prepared from pyrrolidinoacetyl-thiosemicarbazide-1) hydrochloride and concentrated sulfuric acid.

*Analysis.*—$C_7H_{12}N_4S$: Calculated: C, 45.6%; H, 6.50%; Found: C, 45.7%; H, 6.62%.

EXAMPLE 32

Using a procedure analogous to that described in Example 2, 2-amino-5-γ-pyrrolidino-n-propyl)-1,3,4-thiadiazole, M.P. 178–180° C., was prepared from γ-pyrrolidinobutyryl-thiosemicarbazide-(1) hydrochloride and concentrated sulfuric acid.

*Analysis.*—$C_9H_{16}N_4S$: Calculated: C, 50.9%; H, 7.60%; Found: C, 50.9%; H, 7.52%.

EXAMPLE 33

Using a procedure analogous to that described in Example 2, 2-amino-5-(α-di-n-propylamino-ethyl)-1,3,4-thiazole, M.P. 118–119° C., was prepared from α-(di-n-propylamino)-propionyl - thiosemicarbazide - (1) hydrochloride and concentrated sulfuric acid.

*Analysis.*—$C_{10}H_{20}N_4S$: Calculated: C, 52.6%; H, 8.83%; Found: C, 52.4%; H, 8.76%.

EXAMPLE 34

Using a procedure analogous to that described in Example 2, 2-amino-5-(γ-dimethylamino-n-propyl)-1,3,4-thiadiazole, M.P. 194–196° C., was prepared from γ-dimethylamino-butyrl-thiosemicarbazide-(1) hydrochloride and concentrated sulfuric acid.

*Analysis.*—$C_9H_{18}N_4S$: Caluculated: C, 50.4%; H, 8.47%; Found: C, 50.6%; H, 8.47%.

EXAMPLE 35

Using a procedure analogous to that described in Example 2, 2-amino-5-(γ-di-n-propylamino-n-propyl)-1,3,4-thiadiazole, M.P. 149–150° C., was prepared from γ-(di-n - propylamino) - butyryl - thiosemicarbazide-(1) hydrochloride and concentrated sulfuric acid.

*Analysis.*—$C_{11}H_{22}N_4S$: Calculated: C, 54.5% H, 9.15%; Found: C, 54.6%; H, 8.90%.

EXAMPLE 36

Using a procedure analogous to that described in Example 2, 2 - allylamino - 5 - (diallylamino-methyl)-1,3,4-thiadiazole dihydrochloride, M.P. 177–178° C., of the formula

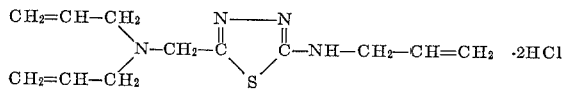

was prepared from N,N-diallylglycyl-4-allyl-thiosemicarbazide-(1) hydrochloride and concentrated sulfuric acid.

*Analysis.*—$C_{12}H_{18}N_4S \cdot 2HCl$: Calculated: C, 44.6%; H, 6.24%; Found: C, 44.6%; H, 6.08%.

EXAMPLE 37

Using a procedure analogous to that described in Example 2, 2-anilino-5-(diallylamino-methyl)-1,3,4-thiadiazole, M.P. 108–110° C., of the formula

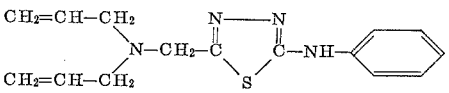

was prepared from N,N-diallyglycyl-4-phenyl-thiosemicarbazide-(1) hydrochloride and concentrated sulfuric acid.

*Analysis.*—$C_{15}H_{18}N_4S$: Calculated: C, 62.9%; H, 6.33%; Found: C, 63.1%; H, 6.42%.

EXAMPLE 38

Using a procedure analogous to that described in Example 2, 2-anilino-5-(di-n-butylamino-methyl)-1,3,4-thiadiazole, M.P. 145–146° C., was prepared from N,N-di-n-butylglycyl-4-phenyl-thiosemicarbazide-(1) hydrochloride and concentrated sulfuric acid.

*Analysis.*—$C_{17}H_{26}N_4S$: Calculated: C, 64.1%; H, 8.23%; Found: C, 63.5%; H, 8.10%.

EXAMPLE 39

Using a procedure analogous to that described in Example 2, 2 - amino - 5 - (N - cyclohexyl - N-methylamino-methyl)-1,3,4-thiadiazole, M.P. 220–222° C., was prepared from N - cyclohexyl - N-methylglycyl-thiosemicarbazide-(1) hydrochloride and concentrated sulfuric acid.

*Analysis.*—$C_{10}H_{18}N_4S$: Calculated: C, 53.06%; H, 8.02%; Found: C, 53.20%; H, 8.03%.

EXAMPLE 40

Using a procedure analogous to that described in Example 2, 2-allylamino-5-(N-cyclohexyl-N-methylamino-methyl)-1,3,4-thiadiazole dihydrochloride, M.P. 227–228° C., was prepared from N-cyclohexyl-N-methylglycyl-4-allyl-thiosemicarbazide-(1) hydrochloride and concentrated sulfuric acid.

*Analysis.*—$C_{13}H_{22}N_4S \cdot 2HCl$: Calculated: C, 46.2%; H, 6.55%; Found: C, 45.6%; H, 6.98%.

EXAMPLE 41

Using a procedure analogous to that described in Example 2, 2 - anilino - 5 - (N - cyclohexyl-N-methylaminomethyl)-1,3,4-thiadiazole, M.P. 93–95° C., was prepared from N-cyclohexyl-N-methylglycyl-4-phenyl-thiosemicarbazide-(1)-hydrochloride and concentrated sulfuric acid.

Analysis.—$C_{16}H_{22}N_4S$: Calculated: C, 63.54%; H, 7.33%; Found: C, 63.30%; H, 7.47%.

EXAMPLE 42

Using a procedure analogous to that described in Example 2, 2 - amino - 5 - (N - methylanilino-methyl)-1,3,4-thiadiazole, M.P. 214–216° C. of the formula

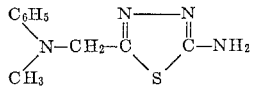

was prepared from N-phenyl-N-methylglycyl-thiosemicarbazide-(1) hydrochloride and concentrated sulfuric acid.

Analysis.—$C_{10}H_{12}N_4S$: Calculated: C, 54.5%; H, 5.49%; Found: C, 54.6%; H, 5.65%.

EXAMPLE 43

Using a procedure analogous to that described in Example 2, 2-amino - 5 - [β-(N-methylanilino)-ethyl]-1,3,4-thiadiozole, M.P. 162–163° C., was prepared from β-(N-phenyl - N - methylamino) - propionyl-thiosemicarbazide-(1) hydrochloride and concentrated sulfuric acid.

Analysis.—$C_{11}H_{20}N_4S$: Calculated: C, 55.0%; H, 8.39%; Found: C, 54.9%; H, 8.42%.

EXAMPLE 44

Using a procedure analogous to that described in Example 2, 2-allylamino-5-(N-methylanilino-methyl)-1,3,4-thiadiazole, M.P. 77–78° C., was prepared from N-phenyl-N-methylglycyl-4-allyl-thiosemicarbazide-(1) hydrochloride and concentrated sulfuric acid.

Analysis.—$C_{13}H_{22}N_4S$: Calculated: C, 58.6%; H, 8.32%; Found: C, 58.3%; H, 8.39%.

EXAMPLE 45

Using a procedure analogous to that described in Example 2, 2-amino-5-(N-benzyl-N-methylamino-methyl)-1,3,4-thiadiazole, M.P. 203–204° C., of the formula

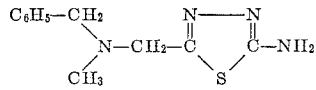

was prepared from N-benzyl-N-methylglycyl-thiosemicarbazide-(1) hydrochloride and concentrated sulfuric acid.

Analysis.—$C_{11}H_{14}N_4S$: Calculated: C, 56.4%; H, 6.02%; Found: C, 56.4%; H, 6.28%.

EXAMPLE 46

Using a procedure analogous to that described in Example 2, 2-amino - 5 - (morpholino-methyl)-1,3,4-thiadiazole, M.P. 233–235° C., was prepared from morpholino-acetyl-thiosemicarbazide-(1) hydrochloride and concentrated sulfuric acid.

Analysis.—$C_7H_{12}N_4OS$: Calculated: C, 42.0%; H, 6.04%; Found: C, 42.2%; H, 6.01%.

EXAMPLE 47

Using a procedure analogous to that described in Example 2, 2-amino-5-(γ-morpholino-n-propyl)-1,3,4-thiadiazole, M.P. 175–176° C., of the formula

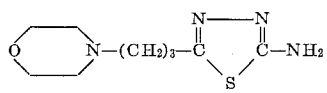

was prepared from γ-morpholino-butyryl-thiosemicarbazide-(1) hydrochloride and concentrated sulfuric acid.

Analysis.—$C_9H_{16}N_4OS$: Calculated: C, 47.3%; H, 7.06%; Found: C, 47.7%; H, 7.12%.

EXAMPLE 48

Using a procedure analogous to that described in Example 2, 2-amino-5-(piperidino-methyl)-1,3,4-thiadiazole, M.P. 245–247°C., of the formula

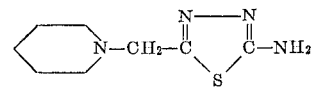

was prepared from piperidinoacetyl-thiosemicarbazide-(1) hydrochloride and concentrated sulfuric acid.

Analysis.—$C_8H_{14}N_4S$: Calculated: C, 48.46%; H, 7.12%; Found: C, 48.45%; H, 7.11%.

EXAMPLE 49

Using a procedure analogous to that described in Example 2, 2-amino-5-(β-piperidino-ethyl)-1,3,4-thiadiazole, M.P. 198–199° C., was prepared from β-piperidinopropionyl-thiosemicarbazide-(1) hydrochloride and concentrated sulfuric acid.

Analysis.—$C_9H_{16}N_4S$: Calculated: C, 50.9%; H, 7.6%; Found: C, 50.8%; H, 7.63%.

EXAMPLE 50

Using a procedure analogous to that described in Example 2, 2-amino-5-(γ-piperidino-n-propyl)-1,3,4-thiadiazole, M.P. 205–207° C., was prepared from γ-piperidino-butyryl-thiosemicarbazide-(1) hydrochloride and concentrated sulfuric acid.

Analysis.—$C_{10}H_{18}N_4S$: Calculated: C, 53.0%; H, 8.02%; Found: C, 52.8%; H, 8.01%.

EXAMPLE 51

Using a procedure analogous to that described in Example 2, 2 - amino-5-(β-pyrrolidino - ethyl)-1,3,4-thiadiazole, M.P. 184° C., was prepared from β-pyrrolidino-propionyl-thiosemicarbazide-(1) hydrochloride and concentrated sulfuric acid.

Analysis.—$C_8H_{14}N_4S$: Calculated: C, 48.5%; H, 7.12%; Found: C, 48.8%; H, 7.25%.

EXAMPLE 52

Using a procedure analogous to that described in Example 4, 2-acetamido-5-(diethylamino-methyl)-1,3,4-thiadiazole, M.P. 203–204° C., was prepared from 2-amino-5 - (diethylamino - methyl) - 1,3,4 - thiadiazole and acetyl chloride.

Analysis.—$C_9H_{16}N_4OS$: Calculated: C, 47.34%; H, 7.06%; Found: C, 47.35%; H, 7.07%.

EXAMPLE 53

Using a procedure analogous to that described in Example 4, 2-acetamido-5-(di-n-propylamino-methyl)-1,3,4-thiadiazole, M.P. 135° C., was prepared from 2-amino-5-(di-n-propylamino-methyl) - 1,3,4-thiadiazole and acetyl chloride.

Analysis.—$C_{11}H_{20}N_4OS$: Calculated: C, 51.53%; H, 7.86%; Found: C, 51.80%; H, 7.87%.

EXAMPLE 54

Using a procedure analogous to that described in Example 4, 2-acetamido-5-(di-n-butylamino-methyl)-1,3,4-thiadiazole, M.P. 96–97° C., was prepared from 2-amino-5-(di-n-butylamino-methyl)-1,3,4-thiadiazole and acetyl chloride.

Analysis.—$C_{12}H_{24}N_4OS$: Calculated: C, 54.9%; H, 8.51%. Found: C, 55.1%; H, 8.63%.

EXAMPLE 55

Using a procedure analogous to that described in Example 4, 2-acetamido-5-(diallylamino-methyl)-1,3,4-thiadiazole, M.P. 133–135° C., of the formula

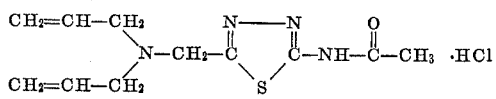

was prepared from 2-amino-5-(diallylamino-methyl)-1,3,4-thiadiazole and acetyl chloride.

*Analysis.*—$C_{11}H_{16}N_4OS$: Calculated: C, 52.36%; H, 6.39%. Found: C, 51.70%; H, 6.38%.

The compounds of the present invention, that is, the compounds embraced by Formula I above and their non-toxic, pharmacologically acceptable acid addition salts, have useful pharmacodynamic properties in warm-blooded animals. More particularly, the compounds according to the present invention exhibit antitussive and antipyretic activities.

For therapeutic purposes the compounds according to the present invention are administered perorally or parenterally to warm-blooded animals as active ingredients in dosage unit compositions, that is, compositions in dosage unit form consisting essentially of an inert pharmaceutical carrier and one dosage unit of the active ingredient, such as tablets, coated pills, solutions, suspensions, capsules, suppositories and the like. One dosage unit of the compounds of the present invention is from 20 to 50 mgm., preferably 30 mgm.

The following examples illustrate a few dosage unit compositions comprising a compound of the present invention as an active ingredient. The parts are parts by weight, unless otherwise specified.

EXAMPLE 56

Cough syrup

The syrup is compounded from the following ingredients:

| | Parts |
|---|---|
| 2-amino-5-(diallylaminomethyl)-1,3,4-thiadiazole | 0.25 |
| Tartaric acid | 0.25 |
| Benzoic acid | 0.2 |
| Food color | 0.01 |
| Ethanol | 5.0 |
| Sugar | 65.0 |
| Flavoring | 0.1 |
| Distilled water q.s.ad. | 120.0 |

Compounding procedure:

The benzoic acid, the tartaric acid, the thiadiazole compound, the food color and the sugar are successively dissolved in the distilled water at 80° C. The solution is cooled to room temperature, and a mixture of the ethanol and the flavoring is added to and thoroughly admixed with the aqueous solution. The finished syrup is filtered to remove suspended matter. 10 cc. of the finished syrup contain 25 mg. of the active ingredient.

EXAMPLE 57

Gelatin capsules

The capsule filler composition is compounded from the following ingredients:

| | Parts |
|---|---|
| 2-amino-5-(diallylaminomethyl)-1,3,4-thiadiazole | 30.0 |
| Crystallized lactose | 70.0 |
| Total | 100.0 |

Compounding procedure: The thiadiazole compound is intensively and uniformly admixed with the lactose, and the mixture is filled into gelatin capsules, each holding 100 mg. of the mixture. Each capsule contains 30 mg. of the active ingredient.

While the present invention has been illustrated with the aid of certain specific embodiments thereof, it will be understood that the invention is not restricted to these embodiments and that various changes and modifications may be made without departing from the spirit of the invention or the scope of the appended claims.

I claim:

1. A compound selected from the group consisting of thiadiazole derivatives of the formula

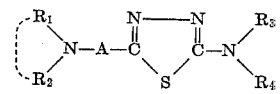

wherein $R_1$ and $R_2$ are each selected from the group consisting of lower alkyl, allyl, phenyl, benzyl and cyclohexyl and, together with each other and the nitrogen atom to which they are attached, form a basic heterocyclic ring selected from the group consisting of pyrrolidino, piperidino, morpholino and camphidino, $R_3$ is selected from the group consisting of hydrogen, alkyl of 1 to 8 carbon atoms, diethylamino-lower allkyl, allyl, phenyl, acetyl and benzoyl $R_4$ is selected from the group consisting of hydrogen and ethyl, and A is alkylene of 1 to 3 carbon atoms, and their non-toxic, pharmacologically acceptable acid addition salts.

2. 2-amino-5-(diallylamino-methyl)-1,3,4-thiadiazole.

3. 2-amino-5-(di-n-amylamino-methyl) - 1,3,4 - thiadiazole.

4. 2-amino-5-($\alpha$-diallylamino-ethyl)-1,3,4-thiadiazole.

References Cited

UNITED STATES PATENTS

| 1,915,334 | 6/1933 | Salzberg et al. | 260—243 |
| 2,075,359 | 3/1937 | Salzberg et al. | 167—22 |

NICHOLAS S. RIZZO, *Primary Examiner.*

J. TOVAR, *Assistant Examiner.*

U.S. Cl. X.R.

167—55, 65; 260—247.1, 256, 293.4

UNITED STATES PATENT OFFICE
CERTIFICATE OF CORRECTION

Patent No. 3,419,575  December 31, 19

Gerhart Rudolf Griss

It is certified that error appears in the above identified patent and that said Letters Patent are hereby corrected as shown below:

Column 6, after line 39, insert -- Analysis. —— $C_{13}H_{26}N_4S$: Calculated C, 57.8%; H, 9.63%; Found: C, 58.05%; H, 9.77%. --. Column 7, line 30, "mopholino" should read -- morpholino --; line 64, "hydrochloric" should read -- hydrochloride --. Column 8, lines 67 to 70, the formula should appear as shown below:

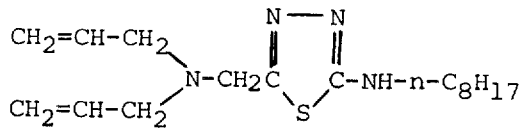

Column 10, line 7, "Cahculated" should read -- Calculated --; line 42, "diallyglcyl" should read -- diallylglycyl --. Column 14, line 39, "allkyl" should read -- alkyl --.

Signed and sealed this 17th day of March 1970.

(SEAL)
Attest:

EDWARD M. FLETCHER, JR.
Attesting Officer

WILLIAM E. SCHUYLER, JR
Commissioner of Patents